T. WIEDEMANN & J. H. TEMPLIN.
DUST SEPARATOR AND FILTERING MECHANISM FOR VACUUM CLEANERS.
APPLICATION FILED AUG. 11, 1909.

1,044,613.

Patented Nov. 19, 1912.

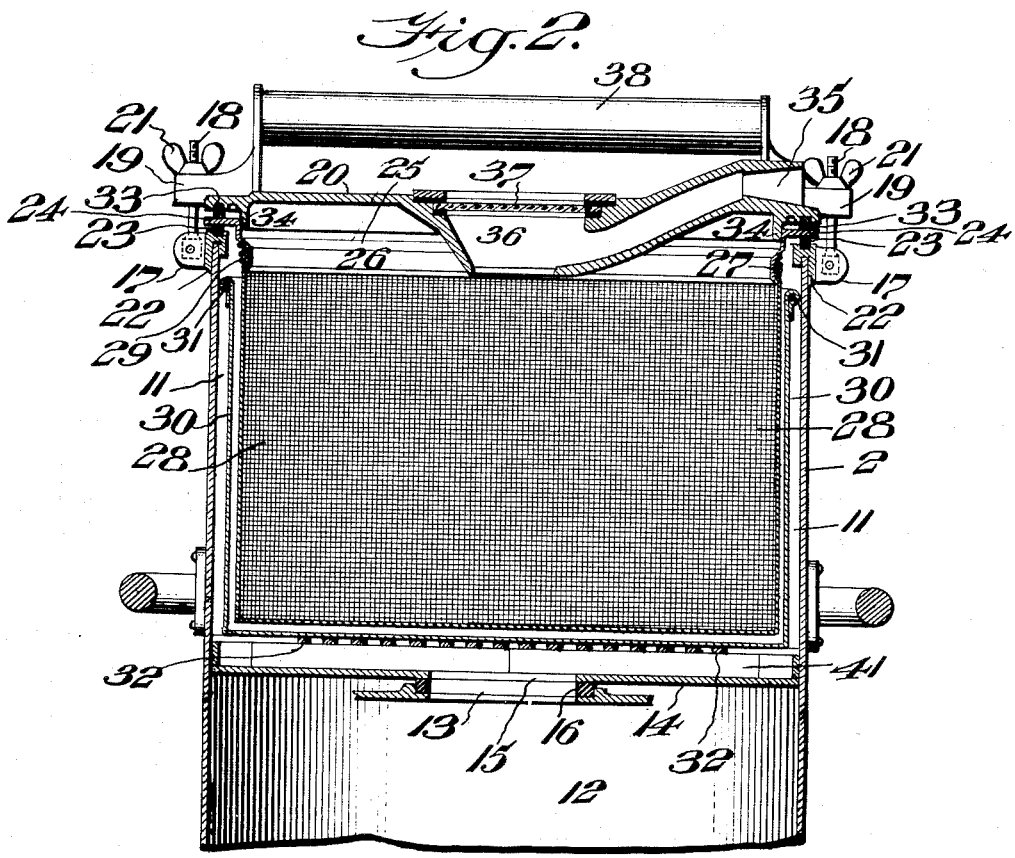
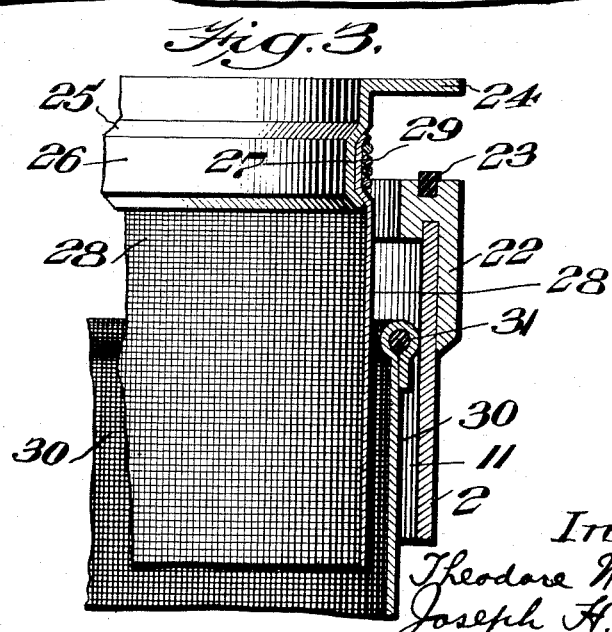

UNITED STATES PATENT OFFICE.

THEODORE WIEDEMANN AND JOSEPH H. TEMPLIN, OF PHILADELPHIA, PENNSYLVANIA, ASSIGNORS TO KELLER MANUFACTURING COMPANY, A CORPORATION OF DELAWARE.

DUST SEPARATOR AND FILTERING MECHANISM FOR VACUUM-CLEANERS.

1,044,613. Specification of Letters Patent. Patented Nov. 19, 1912.

Original application filed May 3, 1909, Serial No. 493,724. Divided and this application filed August 11, 1909. Serial No. 512,283.

*To all whom it may concern:*

Be it known that we, THEODORE WIEDEMANN and JOSEPH H. TEMPLIN, both citizens of the United States, residing in the city and county of Philadelphia, State of Pennsylvania, have invented a new and useful Dust Separator and Filtering Mechanism for Vacuum-Cleaners, of which the following is a specification.

Our present invention relates to a novel construction of dust separator and filtering mechanism which is especially adapted to be employed in conjunction with vacuum cleaners wherein the dirt, dust and foreign material are separated from the dust-laden air entering the machine so that the purified air may discharge from the machine directly into the room or other place in which the machine is operating.

We have shown, for purposes of illustration, our novel construction of dust separator and filtering mechanism as employed in conjunction with a motor actuated vacuum cleaner of the portable type, the filtering mechanism being located in the vacuum chamber in such a manner as to render such mechanism readily accessible for inspection or removal.

With the above in view our invention consists of a novel construction of a filtering mechanism comprising one or a plurality of filtering fabrics removably supported within a casing, means being provided for conducting dust-laden air into contact with the filtering fabrics.

Our invention further consists of a novel construction of filtering mechanism wherein a plurality of filtering fabrics are located in a vacuum chamber, the vacuum of which is substantially a constant during the working operation so that the pressure on opposite sides of the filtering fabrics is substantially the same.

It further consists of a novel manner of supporting the filtering fabrics.

It further consists of a novel construction of a dust bag ring and novel means for securing the same in air tight engagement with the cover and the casing.

It further consists of other novel features of construction, all as will be hereinafter fully set forth.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of these instrumentalities as herein shown and described.

Figure 1 represents a sectional elevation of a vacuum cleaner, showing a dust separator and filtering mechanism embodying our invention in operative relation with respect thereto. Fig. 2 represents a sectional elevation of our device, certain parts having been removed for the sake of clearness of illustration. Fig. 3 represents on an enlarged scale a sectional elevation of a portion of our device, the dust bag ring and one of the bags being shown in the position it assumes when the bag is being removed from or inserted in the casing.

Similar numerals of reference indicate corresponding parts in the figures.

Referring to the drawings:—In order to more clearly set forth our invention, we have shown the same in assembled position in a vacuum cleaner conforming to a construction which is described and broadly claimed in our prior pending application for vacuum cleaning apparatus, filed May 3, 1909, Serial No. 493,724, of which the present case is a division, although it will be apparent that our novel filtering mechanism may be employed in conjunction with any desired type of cleaning device and in the detailed description of our device we will describe as briefly as possible the suction creating mechanism since the same is broadly claimed in our above mentioned pending application to which reference may be had for a detailed description of the construction and operation thereof.

1 designates the base of the vacuum cleaner which is preferably provided with suitable rollers, said base being adapted to be secured to the casing 2 which may be of any desired contour but which, in the present instance, is shown as having a cylindrical form.

3 designates members movably connected with the base 1 and provided with nuts or their equivalents 4, whereby the base 1 is suitably interlocked with respect to the casing 2, it being seen that the members 3 pass through members 5 projecting from the casing 2.

6 designates a motor located within the casing and supported in the present instance upon the base 1, said motor having suitably mounted on its shaft on opposite sides thereof the connecting rods 7 which are suitably connected with the suction creating member 8 of the pump 9, the casing of which latter is preferably supported on standards 10 carried by the base 1. The pump 9 divides the casing 2 into two compartments, a vacuum compartment 11 and a pressure compartment 12, the pump 9 being provided with an inlet port 13 communicating with the vacuum compartment.

14 designates a plate or pan preferably in air tight engagement with the sides of the casing 2 and provided with an opening 15 which communicates with the pump inlet port 13, it being seen by reference to Fig. 1 that a strip of suitable packing 16 is interposed between the plate 14 and the pump 9 whereby an air tight connection is formed at such point.

17 designates slotted lugs or ears in which are pivoted the bolts 18 which latter are adapted to pass through the slotted extensions 19 of the cover 20, said bolts being provided with suitable nuts 21 whereby the parts are maintained in their assembled position. The slotted lugs or ears 18 are preferably carried by an annular member 22 secured to the upper portion of the casing 2, said annular member being adapted to receive a packing strip 23 on which is adapted to be seated the laterally extending flange 24 of a dust bag ring 25 which latter is provided with a depending flange 26, the lower portion of which is preferably inwardly deflected as indicated at 27 thereby adapting the same to have secured thereto the upper portion of a dust bag or filtering fabric 28 by means of a resilient or other fastening device 29 which may consist of a wire, string or other suitable cord, if desired.

30 designates the outer dust bag or filtering fabric the upper end of which has secured thereto in any desired manner a preferably resilient ring 31 so that the upper portion of the outer filtering bag 30, which is preferably constructed of felt or other filtering material, will closely engage the sides of the vacuum chamber 11. The lower portion of the outer filtering bag 30 is supported on an apertured plate 32, the diameter of which is preferably greater than the diameter of the opening 15 in the plate 14 and less than the diameter of the vacuum chamber 11.

33 designates a packing strip suitably carried by the cover 20 and adapted to engage the laterally extending flange 24 of the dust bag ring 25 when the parts are in assembled position, so that when the filtering mechanism is in place an air tight connection is formed between the casing and the dust bag ring, as will be apparent to those skilled in this art.

The cover 20 is preferably provided with a depending flange 34 which extends into the dust bag ring and if desired may be in close engagement therewith.

35 designates the inlet port through which the dust laden air enters and this port is adapted in any suitable manner to receive one end of the hose to which is secured the suction nozzle, through which the dust-laden air enters. The inlet port 35 communicates with a preferably conical shaped chamber 36, which latter communicates with the vacuum chamber 11, the upper portion of said chamber 36 being closed by means of a transparent member 37 which is secured in position with respect to the cover in any suitable manner.

The cover 20 may be provided with a handle 38 which is preferably of sufficient length so that when it is desired to transport the apparatus from one apartment or room to another the handle can be readily grasped by two people if desired.

In the operation of the filtering mechanism, the dust-laden air enters through the inlet 35, passes through the observation chamber 36 into the vacuum chamber 11 and since the vacuum in such chamber is substantially constant during the working operation of the vacuum cleaner, the air will pass through the inner filtering fabric 28 and the outer filtering fabric 30 at a slow speed so that all of the dust, dirt and foreign impurities contained within the air will be removed therefrom and the air in its purified condition will pass from the vacuum chamber 11 through the port 15 and inlet port 13 into the pumping chamber 39 of the pump 9 and thence through the ports in the suction creating member 8 of the pump into the pressure compartment 12, from which the air is discharged to the atmosphere through the restricted port 40. Nearly all of the dust, dirt and foreign material will be contained within the inner filtering bag 38 which is preferably constructed of canvas or other suitable filtering fabric. Owing to the manner in which the lower portion of the outer filtering bag 30 is supported there is no liability of the lower portion of this bag being drawn into the pump inlet port 13 and into contact with the valve mechanism therein. When it is desired to remove the filtering fabrics, in order to clean the same, it is simply necessary to loosen the thumb nuts 21 whereupon the cover may be readily removed, the dust bag ring 25 may then be removed, together with the inner filtering bag 28 as will be apparent to those skilled in this art. The outer bag 30 may then be removed if desired.

The object of employing two dust bags or filtering fabrics is to insure a thorough filtering of the air before it reaches the pumping chamber, it being unnecessary to remove the outer dust bag 30 as frequently as the inner one, as is evident.

We wish to call particular attention to the fact that in our present invention the filtering mechanism is located within the vacuum chamber so that the pressure on opposite sides of the filtering fabric is substantially the same, so that the air will pass through the filtering fabrics in such a manner as to remove the impurities from the dust-laden air in a very efficient and reliable manner and in so far as we are aware we are the first in the art to locate a filtering mechanism within a vacuum chamber wherein the vacuum is substantially constant during the working operation of the machine and the pressure on opposite sides of the filtering fabrics substantially the same.

In our present construction we employ a vacuum chamber of relatively large volume with respect to the pumping mechanism so that a very large area of filtering surface is provided for the dust-laden air and if desired the dust bags may be folded within the vacuum chamber in order to increase the area of the filtering surface.

By the provision of suitable wings 41 carried by the plate 14 the apertured plate 32 is supported in such a manner as to positively prevent the filtering fabrics clogging the pump inlet port, The wings 41 consist of strips of metal or other suitable material supported within or upon the plate or pan 14.

50. In a co-pending application for vacuum cleaning apparatus, filed by us on May 3rd, 1909, Serial No. 493,724, we have described and broadly claimed a novel construction of a dust separating and filtering device comprising a plurality of filtering devices located within the vacuum compartment and also a novel manner of securing the filtering devices in position, which construction *per se* is disclaimed herein. In our present application, we make no claim to the above mentioned disclaimed matter involved in our co-pending application hereinbefore referred to, wherein we have shown a vacuum chamber having an inlet and an outlet, a filtering device supported intermediate the cover and the casing and in air tight engagement therewith and an outer filtering bag surrounding the inner filtering device the upper end of the outer bag being in frictional engagement with the walls of the vacuum reservoir, in combination with means for maintaining a vacuum in the vacuum reservoir. In the present application we particularly define and claim the novel means comprising the plate or its equivalent for engaging the lower end of the outer filtering bag, whereby the filtering fabrics are prevented from clogging the inlet port to the pumping chamber and also from coming into contact with the valve mechanism of the pumping mechanism. The means for supporting the lower end of the filtering bag particularly referred to herein, comprises specifically an apertured member or its equivalent supported in any suitable manner, but preferably on wings extending across the inlet to the pumping mechanism and it is this feature which is illustrated in our co-pending application hereinbefore referred to and also in the present application to which the claims in the present application are particularly directed.

So far as we are aware, we are the first in the art to combine with one or two dust bags constructed and located substantially as described, an apertured supporting plate or indeed, any support or plate, apertured or otherwise in an apparatus of the general character described, and our claims to these features are therefore to be interpreted with corresponding scope.

In the foregoing specification and in our claims hereafter made, we of course use the term vacuum not in its strict sense, but as it is ordinarily employed to describe the mode of operation and characteristics of this class of devices, and as referring practically to a condition of pressure sufficiently below the normal atmospheric pressure to be efficient in producing the desired result.

Having thus described our invention, what we claim as new and desire to secure by Letters Patent, is:—

1. In a device of the character described, a casing having a vacuum chamber provided with an inlet and outlet, a dust separating device depending within said casing, a supporting ring detachable from said casing for the upper portion of said separating device, the latter depending from said ring, and an apertured member located in proximity to said device and intermediate the latter and said outlet, said member being adapted to support said separating device during the creation of the vacuum.

2. In a device of the character described, a casing having a vacuum chamber provided with an inlet and outlet, a plurality of dust separating devices in said casing, means for retaining the upper portions of said devices within said casing, and an apertured member adapted to support the contiguous lower portion of one of said separating devices.

3. In a device of the character described, a casing having a vacuum chamber provided with an inlet and an outlet, a dust separating device in said casing, a supporting ring detachable from said casing for the upper portion of said separating device, the latter depending from said ring, an apertured member located in proximity to said dust separating device, and adapted to contact therewith, and vacuum creating mechanism communicating with said vacuum chamber outlet, said apertured member being located intermediate of said inlet and outlet of said vacuum chamber.

4. In a device of the character described, a casing having a vacuum chamber provided with an inlet and an outlet, a cover for said casing, a dust bag support secured between said cover and casing, a filtering bag carried by said support, an outer filtering bag surrounding the lower portion of said first filtering bag, means for maintaining the upper portion of said outer filtering bag within said casing, and an apertured member supporting the lower end of said outer filtering bag.

5. In a device of the character described, a casing having a vacuum chamber provided with an inlet and an outlet, a cover for said casing, a dust bag support secured between said cover and casing, a filtering bag carried by said support, an outer filtering bag surrounding the lower portion of said first filtering bag, means for maintaining the upper portion of said outer filtering bag in engagement with the inner periphery of said casing, and an apertured member supporting the lower end of said outer filtering bag in combination with means communicating with said vacuum chamber outlet for maintaining a vacuum in said vacuum chamber.

6. In a device of the character described, a casing having a vacuum chamber provided with an inlet and an outlet, a cover for said casing, a plurality of dust bags in said chamber, one of said bags having a laterally extending flange adapted to be retained in position by said cover, a plate located within said casing and having a vacuum chamber outlet therein, laterally extending wings carried by said plate, and an apertured member carried by said wings and supporting the lower end of the outer one of said bags.

7. In a device of the character described, a casing having a vacuum chamber provided with an inlet and an outlet, a cover for said casing, a plurality of dust bags in said chamber, one of said bags having a laterally extending flange adapted to be retained in position by said cover, a plate located within said casing and having a vacuum chamber outlet therein, laterally extending wings carried by said plate, and an apertured member carried by said wings and supporting the lower end of the outer one of said bags, in combination with pumping mechanism communicating with said vacuum chamber outlet.

8. In a device of the character described, a casing having a vacuum chamber provided with an inlet and an outlet, a removable cover for said casing, a plurality of dust bags in said chamber, one of said bags having a laterally extending flange adapted to be retained in position by said cover, a plate located within said casing and having a vacuum chamber outlet therein, an apertured member carried by said plate and supporting the lower end of one of said dust bags, and pumping mechanism communicating with the vacuum chamber outlet.

9. In a filter, a casing having a vacuum chamber therein provided with an inlet and an outlet, a cover for said casing, fastening devices movably carried by said casing and adapted to interlock with said cover, means for causing said interlocking, a filter support located between said cover and said casing and having a laterally extending flange, packing engaging the opposite sides of said flange, an inner filtering bag secured to said support, an outer filtering bag having its upper end in frictional engagement with the sides of the vacuum chamber and surrounding the inner filtering bag and an apertured member supported above said outlet and adapted to support the lower end of said outer filtering bag.

10. In a filter, a casing having a vacuum chamber therein provided with an inlet and an outlet, a cover for said casing, fastening devices movably carried by said casing and adapted to interlock with said cover, means for causing said interlocking, a filter support located between said cover and said casing, and having a laterally extending flange, packing engaging the opposite sides of said flange, an inner filtering bag secured to said support, an outer filtering bag having its upper end in frictional engagement with the sides of the vacuum chamber and surrounding the inner filtering bag, and an apertured member supported above said outlet and adapted to support the lower end of said outer filtering bag, in combination with means communicating with said outlet for maintaining a vacuum within the vacuum chamber.

11. In a device of the character described, a casing having a vacuum chamber therein provided with an inlet and an outlet, a cover for said casing in which said inlet is located, a handle for said cover, means for interlocking said cover and casing in air tight engagement, a filter support having a laterally extending flange supported between said cover and casing, an inner filter bag secured to said support, an outer filter bag having its upper end in frictional engagement with the sides of the vacuum chamber and surrounding the lower end of the inner filter bag, an apertured member supported above said outlet and adapted to support the lower end of said outer filter bag, and means communicating with said outlet for maintaining a vacuum within said vacuum chamber.

12. In a device of the character described, a casing having a vacuum chamber provided with an inlet and an outlet, a dust separating device having its upper end in frictional engagement with the inner periphery of said vacuum chamber, and an apertured member within said chamber and adapted to support the lower portion of said dust separating device.

13. In a device of the character stated, a casing having a vacuum chamber provided with an inlet and an outlet, a dust separating device, a supporting ring detachable from said casing for the upper portion of said separating device, the latter depending from said ring, and a plate within the chamber supporting the lower end of said device against movement toward the outlet.

14. In a device of the character stated, a casing having a vacuum chamber provided with an inlet and an outlet, a flexible dust separator device therein, a supporting ring detachable from said casing for the upper portion of said separating device, the latter depending from said ring and means for supporting the same at the bottom against movement toward the outlet.

15. In a device of the character stated, a casing having a vacuum chamber provided with an inlet and an outlet, means for withdrawing fluid through the outlet to create the vacuum, a flexible dust separating device therein, a supporting ring detachable from said casing for the upper portion of said separating device, the latter depending from said ring, and a support for the lower end of said device extending transversely thereunder.

16. In a device of the character described, a casing having a vacuum chamber provided with an inlet and an outlet, a cover for said casing, a dust bag support secured between said cover and casing, a filtering bag carried by said support and depending therefrom and an apertured member supporting the lower end of said filtering bag during the creation of the vacuum.

17. In a device of the character described, a casing having a vacuum chamber provided with an inlet and an outlet; a cover for said casing; a dust bag support clamped between said cover and said casing; a filtering dust bag carried by said support and extending into said vacuum chamber; an outer filtering dust bag surrounding the lower portion of said first mentioned bag; means independent of the support of said first mentioned bag for maintaining said outer bag in position with relation thereto; and means communicating with the outlet of said vacuum chamber for maintaining a vacuum in said chamber.

THEODORE WIEDEMANN.
JOSEPH H. TEMPLIN.

Witnesses:
H. S. FAIRBANKS,
C. D. McVAY.